United States Patent Office 3,003,852
Patented Oct. 10, 1961

3,003,852
PRODUCTION OF ORTHOPHOSPHORIC ACID
Rolf Gunnar Jonas Nordengren, Landskrona, Sweden, assignor to AB. Kemishka Patenter, Landskrona, Sweden, a limited joint-stock company of Sweden
Filed Oct. 15, 1958, Ser. No. 767,316
Claims priority, application Sweden Feb. 16, 1955
4 Claims. (Cl. 23—165)

This is a continuation-in-part of my application Serial No. 523,071, of July 19, 1955, now abandoned.

The present invention relates to the production of orthophosphoric acid by reaction of raw phosphate with sulphuric acid and separation of the calcium sulphate formed as anhydrite.

The main object of the present invention is to provide a process for the production of phosphoric acid at lower costs than in any other previously known process. A further object is to provide a process that enables a production of high capacity.

A still further object is to provide a high filtration speed in the separation of phosphoric acid from the calcium sulphate formed, said filtration speed enabling a smaller filter surface to be used than in similar previous processes.

The invention will be explained in greater detail in the following paragraphs with reference to the accompanying drawings in which.

Figure 1:
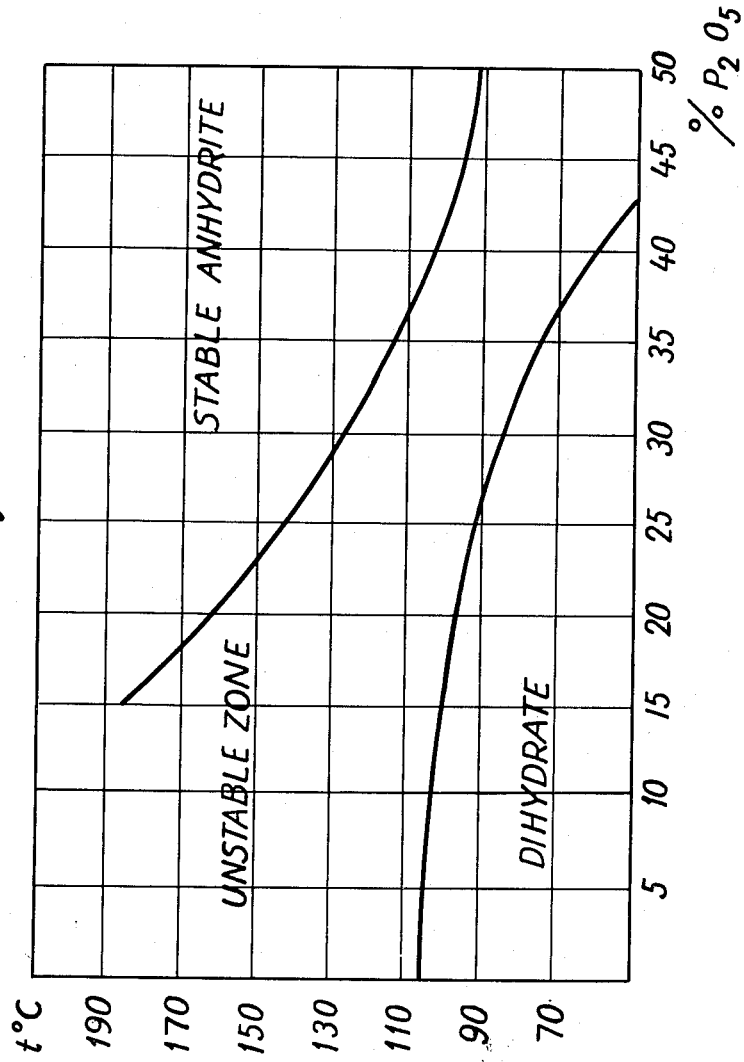
FIGURE 1 is a diagram of operating conditions according to the invention.
Figure 2:
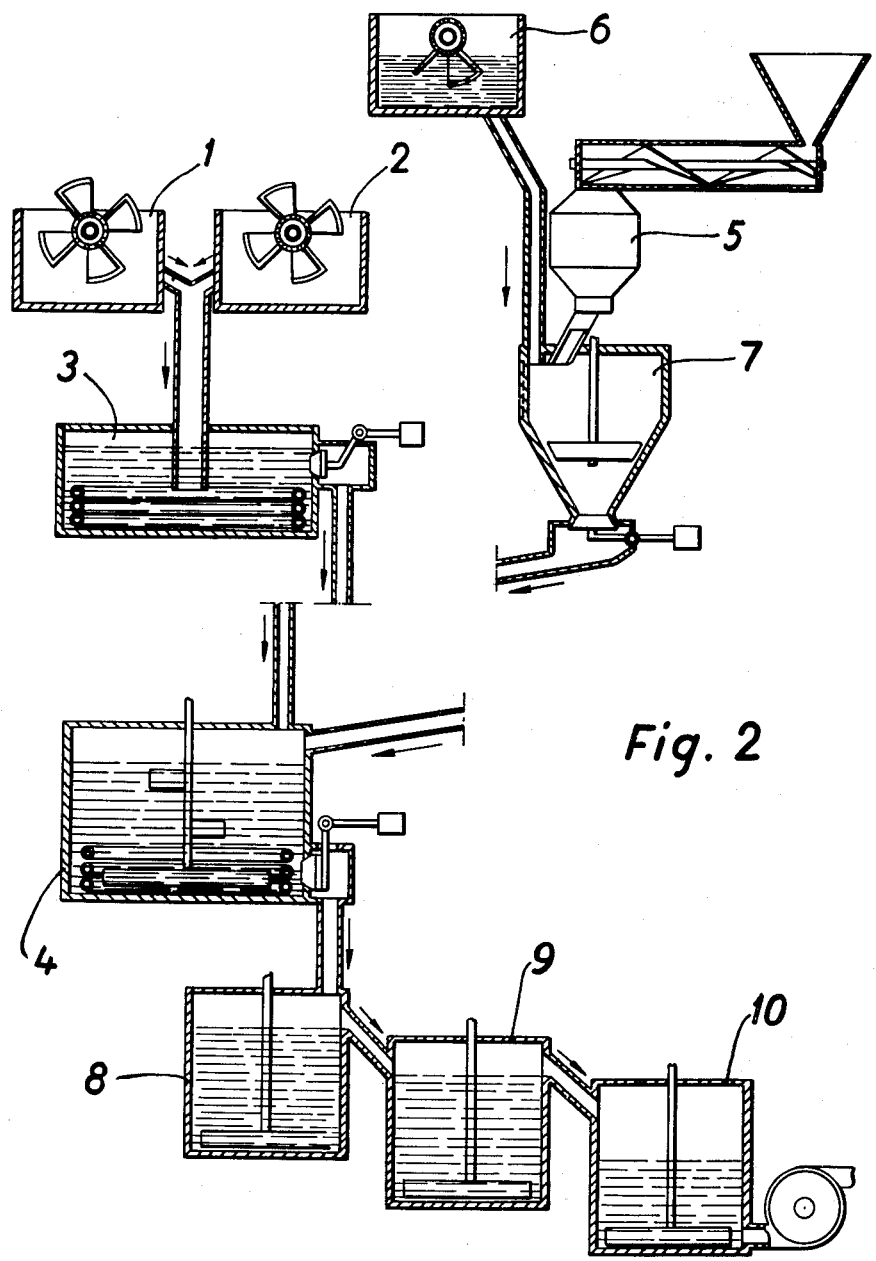
FIGURE 2 is an overall view of a form of apparatus for carrying out the process of the invention.

In the treatment of raw phosphate with sulphuric acid there is also obtained calcium sulphate, which is separated by filtration. The said calcium sulphate may be precipitated in the form of crystals of different form, such as dihydrate, $CaSO_4 \cdot 2H_2O$, semihydrate, $CaSO_4 \cdot \frac{1}{2}H_2O$, and anhydrite, $CaSO_4$. All the said forms may be obtained in such a stabile condition that the calcium sulphate may be washed out without any changes of the crystal form. The formation of a certain type of crystals depends upon the amount of phosphoric acid present in the starting solution and the temperature prevailing during the essential part of the reaction period. At a high temperature and a high concentration there are obtained crystals having low contents of crystal water. An increase of the temperature counteracts a decrease of the concentration and inversely. Accordingly the production of phosphoric acid can be carried out according to either the dihydrate, semihydrate or anhydrite process. The conditions are illustrated on the enclosed diagram, showing the different fields with respect to temperature and the percentage of $P_2O_5$ in the mother liquid, in which dihydrate and stabile anhydrite respectively are formed. In order to produce a phosphoric acid, containing 40–45% $P_2O_5$ it is thus necessary to use a temperature which is above the upper line, that is within the field in which there are formed stabile anhydrite crystals.

The anhydrite process is thus characterized in that the reaction is carried out with such a high temperature and with such a high concentration of phosphoric acid in the mother liquid that the crystal tension is higher than the vapour pressure of the solution, said mother liquid being thus substantially phosphoric acid in the beginning of the reaction in the presence of a relatively large body of sulphuric acid.

It has previously been found that the anhydrite process can on one hand be carried out in such a manner as to obtain relatively large anhydrite crystals and in connection with the establishment of the present invention on the other hand also in such a manner as to obtain crystals of smaller size but instead agglomerated into flocks. The first kind of crystals resulting in a filtration speed of 2000–3000 litres/sq. m. filter surface per hour is obtained by operating the process continuously. The agglomerated crystals are obtained by operating the process intermittently to a certain extent. These crystals show a higher filtration speed, more definitely up to about 10,000 litres/sq. m. an hour. The present invention relates to the last mentioned intermittent process.

In connection with the present invention it has now further been found that the formation of agglomerates of anhydrite crystals is influenced by certain important factors, which are of importance for the formation of easily filterable crystals. The most important step in the reaction between raw phosphate and sulphuric acid is that from the beginning of the reaction and as long as possible there is maintained a high ionic strength in that mixture, in which the agglomeration of anhydrite crystals is to take place to obtain good results. It is due to this that in the present invention there is operated according to an intermittent charging process, in which the charging is carried out during relatively long periods and at rather increased temperature.

The purpose of this step is to increase the ionic strength during the head reaction. The ionic strength is defined as notified as $\frac{1}{2}cz^2$, in which $c$ is the ionic concentration and $z$ the electric ionic loading. The present process has appeared to result in good advantages, if the ionic strength is kept as high as possible, more definitely during such a long time as is necessary to obtain the agglomerated flocks as large as possible. This is achieved by beginning the reaction with a heated mixture of sulphuric acid and phosphoric acid, in which the water present in the phosphoric acid dissociates the sulphuric acid into ions. The agglomeration depends on the fact that the positively loaded crystal nuclea are neutralized by the negative $SO_4^{-2}$-ions, the ions are thus agglomerated as in the precipitation of colloids with electrolytes.

It has further been found that the phosphate rock and the phosphoric acid to be added to the acid mixture in order to form phosphoric acid and anhydrite must be reacted with each other with formation of a gel of monocalcium phosphate. When this gel of monocalcium phosphate is added to the mixed acids there is formed a suspension of colloidal size in the first moments. These particles are attacked by the sulphuric acid and the precipitation and agglomeration start immediately. It has been found paramount that all phosphate rock is reacted in this way. Trials have been made with unreacted phosphate rock constituting a certain portion of the reacted phosphate rock whereby it was shown that the filtrating speed was directly proportional to the portion of reacted substance. It has also been found that the monocalcium phosphate slurry must be newly reacted, that is be in gel form, because if the mixture of phosphate rock and phosphoric acid is allowed to harden and crystallize the resulting slurry will have poor filtrating properties. The foregoing is of importance when working with different phosphate rocks. Sedimentary and magmatic phosphorites have different reaction properties owing to the difference in crystal lattice. The sedimentary phosphate rocks are "softer" and can be more easily disrupted than the magmatic apatites. These two different types of phosphate rock have different properties when they are used for the manufacture of phosphoric acid according to the anhydrite method. It has been found that the reaction with sedimentary phosphate rocks to monocalcium phosphate gel is almost instantaneous if the phosphate rock is ground to a fineness normal for the manufacture of superphosphates. This is not the case when working with apatite. If phosphate rock of the apatite type is used for the production of phosphoric acid without allowing the material to react to the monocalcium phosphate stage the result will be a poor yield and a low filtration speed. When, on the other hand, the reaction is allowed to go to completion with the formation of monocalcium phosphate gel by allowing the materials to react with each other during ½ hour or more with the addition of heat giving the reaction mass a temperature of about 70° C. the yield and filtration speed have been excellent and the same as those obtained by sedimentary phosphate rocks, for instance Morocco phosphate.

The process for the production of phosphoric acid from raw phosphate and sulphuric acid with formation of anhydrite crystals according to the invention is characterized by charging into the mixture of the sulphuric acid and phosphoric acid containing 40–45% $P_2O_5$, and pre-heated to at least 130° C., preferably to 135° C., during a time period of at least 30 minutes, suitably not more than 120 minutes, preferably not more than 90 minutes, particularly 40–80 minutes, a mixture of the raw phosphate in finely ground form and phosphoric acid of the said concentration reacted with each other as described above during such conditions that the calcium sulphate formed is precipitated in the form of anhydrite, the amount of phosphoric acid, calculated as $P_2O_5$ in mixture with sulphuric acid and raw phosphate being at least 2, preferably 3–5 times as large as the amount, calculated as $P_2O_5$, that corresponds to the reaction between the raw phosphate and the sulphuric acid, after which during the reaction the temperature of the mixing vessel is allowed to decrease to a value not lower than about 110–115° C. as well as discharging a mixture consisting of anhydrite, re-circulated and formed phosphoric acid and non-reacted raw phosphate and sulphuric acid from the mixing vessel and then allowing the reaction between not finally reacted phosphate and remaining sulphuric acid to continue, preferably continuously, in a number of subsequent stages, preferably comprising a number of subsequent vessels, during at least 1 hour, preferably 2–4 hours, after which the mixture thus obtained is filtered and the phosphoric acid formed and the phosphoric acid recirculated are recovered.

By keeping the temperature in the reactor, in which the sulphuric acid and phosphoric acid are present at a temperature above a value of 110–115° C., there are thus provided the conditions necessary to form the anhydrite crystals. Simultaneously steps are taken to fix the contents of $P_2O_5$ in the mother liquor between 40–45% $P_2O_5$. Due to the relatively long reaction time the anhydrite crystals formed are thus allowed to agglomerate to larger more easily filterable aggregates.

To have easily filterable crystals available in the production of phosphoric acid is of course of deciding importance for the economy of the process, in as much as in a plant for the production of phosphoric acid of higher concentration, a very large amount of such phosphoric acid is caused to circulate within the process.

In the aforesaid process it is thus of utmost importance that the mixture of raw phosphate and the phosphoric acid, which mixture may be reacted during a considerable time period or preferably is introduced in the pre-heated mixture of phosphoric acid and the sulphuric acid immediately after the mixing operation in the form of a sludge, is added to the mixture of phosphoric acid and the sulphuric acid and not inversely. This order of addition is namely of deciding importance for obtaining easily filterable crystals. The crystals obtained in this manner show a filtration speed which is about 2–3 times larger than the filtration speed which is obtained when operating in the inverse manner, for instance when a mixture of the sulphuric acid and phosphoric acid is charged into a sludge of raw phosphate and phosphoric acid. The fact that crystals having a very good filtration speed are obtained by the said steps is probably due to the fact that sulphuric acid is present in the mother liquid, whereby as stated its ionic strength will increase.

According to the present invention in order to obtain a technical acceptable yield of phosphoric acid it is also necessary to allow the reaction mixture, consisting of anhydrite phosphoric acid, re-circulated phosphoric acid, remaining sulphuric acid and not finally reacted phosphate to react further in a latter stage, suitably comprising a number of subsequent reaction vessels. By this subsequent reaction the yield of the phosphoric acid may be increased considerably without any adverse effect with respect to the filterability of the obtained anhydrite crystals. However, it is important that in the agitation of the mixture in the subsequent reaction vessel, said agitation is carried out in such a manner that the agglomerates formed are not broken, since otherwise the filtration speed will get lost. Also in the charging operation it is important to carry out the agitation without disintegrating the agglomerates formed in a correct way, so as not to disturb the agglomeration of the crystals. On the other hand it is of course necessary to provide a good mixing of the reaction component, so as to obtain as homogeneous reaction conditions in the mixture of the phosphoric acid and the sulphuric acid as possible. The temperature in the subsequent reaction step, which latter particularly consists in that the partially reacted mixture of phosphoric acid, anhydrite, remaining sulphuric acid and partially reacted phosphate deriving from the intermittently operated reactor, is allowed to react to its end, is suitably kept at least about 80° C. This temperature may either be achieved by cooling said mixture or quite simply by allowing the mixture to cool successively. The temperature 80° C. is considered to be most suitable as filtration temperature but also different temperatures may be used within the field of 70–90° C.

According to the present invention it has further been found that the contents of water in the mixture consisting of phosphoric acid and the sulphuric acid, into which the mixture of phosphoric acid and raw phosphate is charged, is of large importance for obtaining easily filterable crystals. According to a preferred embodiment of the present invention the charging of said raw phosphate is effected into mixture of acid, in which there is up to 35% of water present. From the aforesaid consideration in connection with the theory, forming the base of the formation of agglomerated crystals it is easily seen that the importance of the water contents resides in that said water effects an increase dissociation into ions of the sulphuric acid and the phosphoric acid, which ions in turn results in an increase of the ionic strength with the result of favourable conditions for the precipitation and agglomeration of the anhydrite crystals are created.

According to another favourable embodiment of the present invention it has been found suitable to produce the mixture of sulphuric acid and phosphoric acid, into which the mixture of raw phosphate and phosphoric acid is charged by starting from a relatively concentrated sulphuric acid which is then diluted with recirculated phosphoric acid. Due to the dilution of the sulphuric acid heat is liberated, so that the temperature of the mixed acids is increased prior to the insertion of the mixture of raw phosphate and phosphoric acid to the necessary temperature of at least 130° C., preferably at least 135° C. At the beginning of the reaction the temperature of the mixed acids is kept at at least 130° C., the highest value being the boiling point of the mixture under atmospheric pressure, which for a mixture of phosphoric acid and sulphuric acid such as described is by about 145° C.

The raw phosphate used for the production of phosphoric acid according to the present invention may either be apatite or also phosphorite. Suitably the material should be finely ground, since due to this the reaction with the phosphoric acid and sulphuric acid is facilitated. As an example it may be mentioned that most preferably the grinding is driven to the extent that 90% of the material passes through a sieve of about 100 meshes. Of course, the grinding may be driven to a somewhat finer particle size, but also to a coarser particle size, although this is generally of course not so preferable for the reaction. In the same manner an increased disintegration of course results in more favourable possibilities for the reaction with sulphuric acid.

With respect to the aforesaid addition of water to the mixture of phosphoric acid and the sulphuric acid it is further to be stated that said addition should not exceed 35% for the reason that, although there is achieved more favourable conditions for the formation of easily filterable crystals, there is inserted such a large amount of water into the process that it will be necessary to recirculate such large amounts of strong phosphoric acid within the process that the process tends to be not economical. It is not possible to set forth any definite limits with respect to the water contents downwards but it has appeared that the conditions for formation of easily filterable crystals is considerably improved, if the contents of water is put at a value in excess of 15%, preferably 25%.

The most favourable conditions for obtaining easily filterable crystals in this respect appear to be between 25 and 35% water in the mixed acids.

A plant for the production of phosphoric acid according to the present invention will be described now with respect to the enclosed flow sheet.

Vessel 1 contains phosphoric acid which has been recirculated within the process, vessel 2 contains sulphuric acid. Both vessels are provided with dosage devices, which enable the acids to flow down in the reaction vessel 3 continuously or in small portions, said vessel 3 being provided with a heating device, for instance a heating coil, which is heated by steam or another heating medium, such as heated dow-therm or any other similar heating medium of a kind known per se. The dosage devices are of a kind known per se for everyone skilled in the art of chemical operations. From said vessel the heated mixture of acids may be introduced in portions into the reaction vessel or the reactor 4. This occurs about every 45 minutes. With respect to the vessels 1 and 2 it should be stated that same are preferably lined with lead in order to prevent corrosion, but that also other acid-resistant materials may be used. The same applies to the heating tank 3. The heating tank 3 is provided with a valve device, allowing heated acid to flow down into the reactor at different intervals according to the pre-determined program for the intermittent charging in the reactor 4. Said vessel is also provided with an agitation device, which is of such a kind as to allow the reaction mixture of being kept under agitation without effecting any not desired disintegration of agglomerated crystals during the agitation, necessary to obtain a reaction with the mixed acids and a sludge, consisting of raw phosphate and phosphoric acid, to be effected. It is to be mentioned that vessel 3 may be constructed so as to allow about half of the contents to flow out, the remaining portion being sufficient to cover the heating coil. Due to this heating method the heating will be more homogeneous.

Thus, the feeding of the mixed acids into the reactor is carried out by the combination of a continuous or nearly continuous individual feeding of sulphuric acid and phosphoric acid with a feeding of the heated acid mixture in portions.

When a portion of said heated mixture of acids has arrived into the reactor, said reactor is to be fed with crude phosphate dispersed in and reacted with circulating phosphoric acid. This addition should be carried out in portions, for instance every or every second minute. The crude phosphate is weighed in portions with the automatic weighing machine 5. The phosphoric acid is measured in portions, for instance by means of a feed bucket 6, and both said portions are allowed to flow down simultaneously into the mixing vessel 7. After mixing the components for a short time, the valve of the vessel is opened and the contents are allowed to flow down into the reactor 4.

Said reactor which is also provided with an agitator and a heating device, will thus have a considerable excess of sulphuric acid present in the beginning of any reaction period. The excess will decrease gradually during the period. This is of great importance for the formation of well agglomerated anhydrite crystals.

After supplying all the crude phosphate that corresponds to the amount of sulphuric acid that has been supplied, into the reactor, the bottom valve is opened and the contents are allowed to flow down into the first one of the after-reaction vessels 8, 9 and 10. The number of these vessels can vary. In these vessels the reaction is completed within a period of 2–4 hours. Then the filtration may commence.

Of course it is possible to carry out the mixing of crude phosphate with circulating acid continuously, for instance in such a manner as to effect the mixing in a continuous screw mixer and allow the product to flow down into the reactor 4 continuously. However, mixing in portions will involve certain advantages, that is a greater accuracy in the feeding.

The entire feeding apparatus and the reactor can be made to function completely automatically, and weighing, measuring and the opening and closing of valves may be synchronized.

It has been found that a high initial temperature of the reactor 4 is favourable for the formation of well agglomerated crystals. This result is most easily obtained by heating the mixed acid to a high temperature in vessel 3, preferably 135° C., but at least 130° C. During the feeding operation the temperature of the reaction mass in the reactor 4 may be allowed to decrease. The final temperature just before the reaction mass is transferred from the reactor into the vessel 8, should be at least 100° C., but preferably 110 to 115° C. The temperature may be allowed to decrease further in the subsequent reaction vessels 8–10 to 80° C. without the filterability being reduced, said temperature being the most favourable one for carrying out the filtration. In large plants the reaction mass should be cooled in the last subsequent reaction vessel prior to the filtration step in order to reduce the temperature to 80° C., which may be effected by blowing cool air into the vessel 10.

*Examples*

(1) 2400 gms. sulphuric acid with a content of 75% $H_2SO_4$ and 25% water were mixed with 1290 gms. phosphoric acid containing 59% $H_3PO_4$ and 41% water. The mixture was heated to 135° C. and a portion of the water was evaporated until an analysis of the acid mixture showed a total water content of 17.5%. To this mixture there were added 2000 gms. phosphate rock ground to 88.4% through a 100 mesh screen together with 5660 gms. phosphoric acid containing 59% $H_3PO_4$. The addition was made in 30 portions one each second minute during a time of one hour and each portion of phosphate rock and phosphoric acid was stirred together during 30 seconds before the addition to the mixed acid. During this operation the temperature of the resulting slurry was gradually decreased from the 135° C. to 110° C. The slurry was then gently stirred for a further 3 hours after which filtration took place.

The filtration was made in a Büchner funnel with a filter cloth of synthetic material. The slurry temperature was adjusted to 70° C., the vacuum 500 mm. Hg and the quantity of filtrated slurry such that a filter cake of 25 mm. thickness was formed. The time for drainage was taken with a stop watch and the volume of the filtrate measured. The filtration speed was determined as $$F = \frac{V \times 3600}{Y \times t}$$

in which $F$=filtration speed litres/sq. metre, hour
$V$=filtrate volume in litres Y = effective filter surface, square metres
t = filtration time, seconds The filtration speed for the mother liquor was first determined, then three washes with each an amount of water equal to the volume of the filter cake was made.

The filtration speed was in this way determined to be for the mother liquor 2600 litres/sq. m. an hour, and totally including the washings 2000 litres/sq. metre an hour.

(2) A new trial was made with same quantities of ingoing components and generally similar to the first one. The acid mixture evaporation was, however, in this instant carried only so far that the water content in the mixture amounted to 24.9%.

The filtration speeds became:

|  | Litres/square metre, hour |
|---|---|
| Mother liquor | 6800 |
| Totally | 7200 |

(3) A new trial was made as in the first example. The water content in the acid mixture was adjusted to 26.9%.

Filtration speeds:

|  | Litres/square metre, hour |
|---|---|
| Mother liquor | 8000 |
| Totally | 8800 |

(4) A new trial was made as in the first example. The water content in the acid mixture was adjusted to 27.3%.

Filtration speeds:

|  | Litres/square metre, hour |
|---|---|
| Mother liquor | 8600 |
| Totally | 8800 |

(5) A new trial was made as in the first example. The water content in the acid mixture was adjusted to 30.2%.

Filtration speeds:

|  | Litres/square metre, hour |
|---|---|
| Mother liquor | 10,200 |
| Totally | 10,800 |

(6) A new trial was made as in the first example. The water contents in the acid mixture was by adding water adjusted to 31.0%.

Filtration speeds:

|  | Litres/square metre, hour |
|---|---|
| Mother liquor | 10,400 |
| Totally | 11,200 |

Having now particularly described and ascertained the nature of my said invention and in which manner the same is to be performed, I declare that what I claim is:

1. A method of producing a phosphoric acid containing 40 to 45% of $P_2O_5$ which comprises mixing and reacting phosphate rock with phosphoric acid in such relative amounts that a gel of monocalcium phosphate is formed, charging said gel of monocalcium phosphate into a mixture pre-heated to a temperature of at least 130° C. and consisting of phosphoric acid, sulfuric acid and water during a time period of at least 30 minutes to form a reaction mixture consisting essentially of phosphoric acid, calcium sulfate in the form of anhydrite crystals, non-reacted calcium monophosphate, sulfuric acid and water, allowing the temperature of said reaction mixture to decrease to a value not lower than about 110° C. during said charging, the combined amount of phosphoric acid mixed with said phosphate rock and phosphoric acid in said pre-heated mixture, consisting of phosphoric acid, sulfuric acid and water, calculated as $P_2O_5$, being at least twice as large as the amount required to react completely with raw phosphate and sulfuric acid to form phosphoric acid, water and calcium sulfate, discharging said partially reacted mixture and allowing the non-reacted calcium monophosphate and remaining sulfuric acid of said reaction mixture to substantially react completely with each other to form phosphoric acid, water and calcium sulfate in the form of readily filterable anhydrite crystals, and separating said anhydrite crystals by filtration to recover said phosphoric acid, containing 40 to 45% of $P_2O_5$.

2. The method as claimed in claim 1 wherein the separation of said calcium sulfate crystals by filtration is effected at a temperature of between about 70 and 90° C.

3. A method of producing a phosphoric acid containing 40 to 45% of $P_2O_5$ which comprises mixing and reacting phosphate rock with phosphoric acid in such relative amounts that a gel of monocalcium phosphate is formed, charging said gel of monocalcium phosphate into a mixture pre-heated to a temperature between 135° C. and its boiling point and consisting of phosphoric acid, sulfuric acid and water during a time period of 30 to 120 minutes to form a reaction mixture consisting essentially of phosphoric acid, calcium sulfate in the form of anhydrite crystals, non-reacted calcium monophosphate, sulfuric acid and water, allowing the temperature of said reaction mixture to decrease to a value not lower than about 110° C. during said charging, the combined amount of phosphoric acid mixed with said phosphate rock and phosphoric acid in said pre-heated mixture, consisting of phosphoric acid, sulfuric acid and water, calculated as $P_2O_5$, being at least twice as large as the amount required to react completely with raw phosphate and sulfuric acid to form phosphoric acid, water and calcium sulfate, discharging said partially reacted mixture and allowing the non-reacted calcium monophosphate and remaining sulfuric acid of said reaction mixture to react substantially completely with each other during a time period of 2 to 4 hours to form phosphoric acid, water and calcium sulfate in the form of readily filterable anhydrite crystals, and separating said anhydrite crystals by filtration to recover said phosphoric acid containing 40 to 45% of $P_2O_5$.

4. A method of producing a phosphoric acid containing 40 to 45% of $P_2O_5$ which comprises mixing and reacting phosphate rock with phosphoric acid in such relative amounts that a gel of monocalcium phosphate is formed, charging said gel of monocalcium phosphate into a mixture pre-heated to a temperature of at least 130° C. and consisting of phosphoric acid, sulfuric acid and water during a time period of at least 30 minutes to form a reaction mixture consisting essentially of phosphoric acid, calcium sulfate in the form of anhydrite crystals, non-reacted calcium monophosphate, sulfuric acid and water, allowing the temperature of said reaction mixture to decrease to a value not lower than about 110° C. during said charging, the combined amount of phosphoric acid mixed with said phosphate rock and phosphoric acid in said pre-heated mixture, consisting of phosphoric acid, sulfuric acid and water, calculated as $P_2O_5$, being at least twice as large as the amount required to react completely with raw phosphate and sulfuric acid, to form phosphoric acid, water and calcium sulfate, discharging said partially reacted mixture and allowing the non-reacted calcium monophosphate and remaining sulfuric acid of said reaction mixture to react substantially completely with each other to form phosphoric acid, water and calcium sulfate in the form of readily filterable anhydrite crystals, and separating said anhydrite crystals by filtration to recover said phosphoric acid, containing 40 to 45% of $P_2O_5$, said pre-heated mixture consisting of phosphoric acid, sulfuric acid and water, containing water in an amount of 15 to 35%, based on the weight of the whole mixture of acids and water.

References Cited in the file of this patent

UNITED STATES PATENTS

| 2,233,956 | Moore | Mar. 4, 1941 |
| 2,384,814 | Coleman | Sept. 18, 1945 |
| 2,710,247 | Knowles et al. | June 7, 1955 |